United States Patent
Mendonca et al.

(10) Patent No.: US 7,523,503 B2
(45) Date of Patent: Apr. 21, 2009

(54) METHOD FOR PROTECTING SECURITY OF NETWORK INTRUSION DETECTION SENSORS

(75) Inventors: John Mendonca, Redwood City, CA (US); Bryan Stephenson, Alviso, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 919 days.

(21) Appl. No.: 10/349,423

(22) Filed: Jan. 21, 2003

(65) Prior Publication Data

US 2004/0143761 A1  Jul. 22, 2004

(51) Int. Cl.
G06F 11/30 (2006.01)
G08B 29/00 (2006.01)
G08B 23/00 (2006.01)
G06F 12/14 (2006.01)

(52) U.S. Cl. .......................... 726/25; 726/23
(58) Field of Classification Search .............. 726/25, 726/22, 23, 34
See application file for complete search history.

(56) References Cited

U.S. PATENT DOCUMENTS

| | | | | |
|---|---|---|---|---|
| 5,887,134 A * | 3/1999 | Ebrahim | ..................... | 709/200 |
| 5,935,245 A * | 8/1999 | Sherer | ..................... | 726/13 |
| 5,944,789 A * | 8/1999 | Tzelnic et al. | ..................... | 709/214 |
| 6,119,236 A * | 9/2000 | Shipley | ..................... | 726/22 |
| 6,125,457 A * | 9/2000 | Crisan et al. | ..................... | 714/36 |
| 6,266,773 B1 * | 7/2001 | Kisor et al. | ..................... | 726/17 |
| 6,735,701 B1 * | 5/2004 | Jacobson | ..................... | 726/1 |
| 6,768,652 B2 * | 7/2004 | DeLuga | ..................... | 361/801 |
| 6,793,625 B2 * | 9/2004 | Cavallaro et al. | ..................... | 600/440 |
| 6,895,436 B1 * | 5/2005 | Caillau et al. | ..................... | 709/224 |
| 6,898,632 B2 * | 5/2005 | Gordy et al. | ..................... | 709/224 |
| 6,988,208 B2 * | 1/2006 | Hrabik et al. | ..................... | 726/23 |
| 7,058,796 B2 * | 6/2006 | Lynn et al. | ..................... | 713/1 |
| 7,191,438 B2 * | 3/2007 | Bryant | ..................... | 717/176 |
| 7,237,258 B1 * | 6/2007 | Pantuso et al. | ..................... | 726/11 |
| 7,370,359 B2 * | 5/2008 | Hrabik et al. | ..................... | 726/23 |
| 2002/0178378 A1 * | 11/2002 | Shively | ..................... | 713/201 |
| 2004/0019803 A1 * | 1/2004 | Jahn | ..................... | 726/25 |
| 2004/0111636 A1 * | 6/2004 | Baffes et al. | ..................... | 713/201 |

OTHER PUBLICATIONS

"HP Utility Data Center." HP Technical White Paper, Oct. 2001. pp. 1-18.*

* cited by examiner

*Primary Examiner*—Emmanuel L Moise
*Assistant Examiner*—Zachary A Davis

(57) ABSTRACT

A method for providing security for a network intrusion detection system in a provisionable network, the method comprises evaluating the system security of the provisionable network and applying a system lockdown in the provisionable network in accordance with the results of the evaluation.

28 Claims, 3 Drawing Sheets

METHOD FOR PROTECTING SECURITY OF NETWORK INTRUSION DETECTION SENSORS

RELATED U.S. APPLICATION

This application incorporates herein by reference the co-pending patent application, application Ser. No. 10/349,385, entitled "A System For Protecting Security Of A Provisionable Network," filed on Jan. 21, 2003, and assigned to the assignee of the present application.

FIELD OF THE INVENTION

The present invention relates to the field of computer network security. Specifically, the present invention relates to a method and architecture for protecting security of intrusion detection sensors in a provisionable utility data center.

BACKGROUND OF THE INVENTION

Modern networking continues to provide communication and information access increases and improvements. The continuing growth of networking systems and technology seems limitless and the speed of networked communications has brought benefits to nearly every human endeavor.

Recent trends in information technology have seen large enterprises and other users moving towards a new paradigm of network utilization, the provisionable utility data center (UDC). A provisionable data center allows a centralization of information technology (IT) services and enterprise-wide, and even internet-wide, access to specialized data and functions. The various moves to re-centralize IT systems of all kinds are driven in part by shortages in qualified IT staff and by the intrinsic inefficiencies of distributed systems. Notably, many IT managers are migrating to a smaller number of large data centers. Enabled by abundant and relatively inexpensive network bandwidth, IT services can now be distributed to users globally. The need to nest server-side technology near the client workstation is lessening, which has led to this dramatic change in IT architecture.

This re-centralization requires greater resilience, reliability and security, since a failure of shared resources or a loss of critical data can affect an enterprise using a provisionable data center to a large degree. At the same time, though, consolidated provisionable data centers can more easily be engineered to eliminate single points of failure.

Another trend is the growing importance of third-party service providers. Networking enterprises are finding it advantageous to turn to service providers instead of bearing the cost of internal development, deployment, and maintenance of their own in-house systems. In areas such as global networking, service providers dominate in provisioning a commodity resource that enterprises could never develop individually. Storage service providers allow enterprises to cache data conveniently. A small, but growing, contingent of application service providers (ASPs) now are able to operate enterprise software systems. IT service providers are exploiting the opportunity to consolidate across enterprises, which allows them to be highly competitive with internal IT organizations.

The system management tools available to reliably operate and secure the resultant necessarily complex network systems are also emerging. Constant, dynamic, reprovisioning of resources to match shifting clients and client needs depends on a strong IT resource management foundation.

Even more than earlier distributed networks, provisionable data center networks are exposed to possible security lapse and even attack through the multitudinous communications links such systems entail. Because there is necessary communication within and between resources contained within the provisionable data center, as well as communication with users outside the network, the possible avenues of security failure are many.

In addition to the "normal" hacker attack, security breaches can consist of such things as the unauthorized entry into a portion of a database by an otherwise authorized user or the unauthorized use of an application managed by the center. An example of this could be use by a foreign engineering entity of a supercomputer computational fluid dynamics facility, perhaps barred by technology exchange law, wherein the foreign entity's use of other portions of the same provisionable data center is legitimate and desirable.

Another example involves a case wherein there are competing clients legitimately served by the UDC and who share some of the available resources, such as a marketing database. These same two clients may also employ the UDC for secure archiving of proprietary data that neither wants the other to access. Furthermore, the management system of a provisionable data center itself could be the target of a focused intrusion whose goal could be the weakening of the management structure to enable other intrusions.

While there are network intrusion detection systems (NIDS) to aid in security of UDCs, there is little in the way of systems protecting the NIDS itself. A NIDS is a possible target of hostile attacks such as: attempts to gain access to the NIDS by compromising network services such as a web server, SNMP (simple network management protocol), or email; attempts to log into the root or administrator users; attempts to change the file or directory permission to read or modify files on the NIDS sensor or manager, possibly to erase evidence of an intrusion; unauthorized attempts to start services that should not be running on the NIDS sensors.

Previous IDS (Intrusion Detection System) lockdown software has not taken a comprehensive look at IDS security. If products did look at IDS security, they tended to only protect software components that were directly related to IDS software: the IDS registry entry on Microsoft Windows systems, and the file and directory security for the IDS files themselves.

What is needed, then, is a methodology to provide security to the intrusion detection system (IDS) sensors in the provisionable utility data center (UDC) such that the IDS components of the data center can be protected from intrusions that originate from either an external source, such as a public facing internet/virtual private network (VPN), resources provisioned by the data center, or the systems within a less trusted part of the data center's management infrastructure.

SUMMARY OF THE INVENTION

Accordingly, embodiments of the present invention provide a methodology to provide security to the intrusion detection system (IDS) sensors in a provisionable data center, hereafter called a utility data center (UDC), such that data communication traffic on a network segment is monitored, or computer system activity is monitored, or both system and network activity are monitored, and alerts are generated when suspicious events are detected. While the IDS sensors protect the data center, embodiments of the present invention protect the sensors from attackers that do not wish their suspicious network activity to be detected; activity that could lead to a compromise of system or network confidentiality, integrity, or availability.

A method for providing security for a intrusion detection system in a provisionable network, the method comprises evaluating the system security of the provisionable network and applying a system lockdown in the provisionable network in accordance with the results of the evaluation.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation of this invention can be best visualized by reference to the drawings.

DETAILED DESCRIPTION

The following descriptions of specific embodiments of the present invention have been selected for purposes of illustration and description. They are not intended to be exhaustive or to limit the invention to the precise forms disclosed, and obviously many modifications and variations are possible in light of the above teaching.

This application incorporates herein by reference the co-pending patent application, application Ser. No. 10/349,385, entitled "A System For Protecting Security Of A Provisionable Network," filed on Jan. 21, 2003, and assigned to the assignee of the present application.

Figure 1:
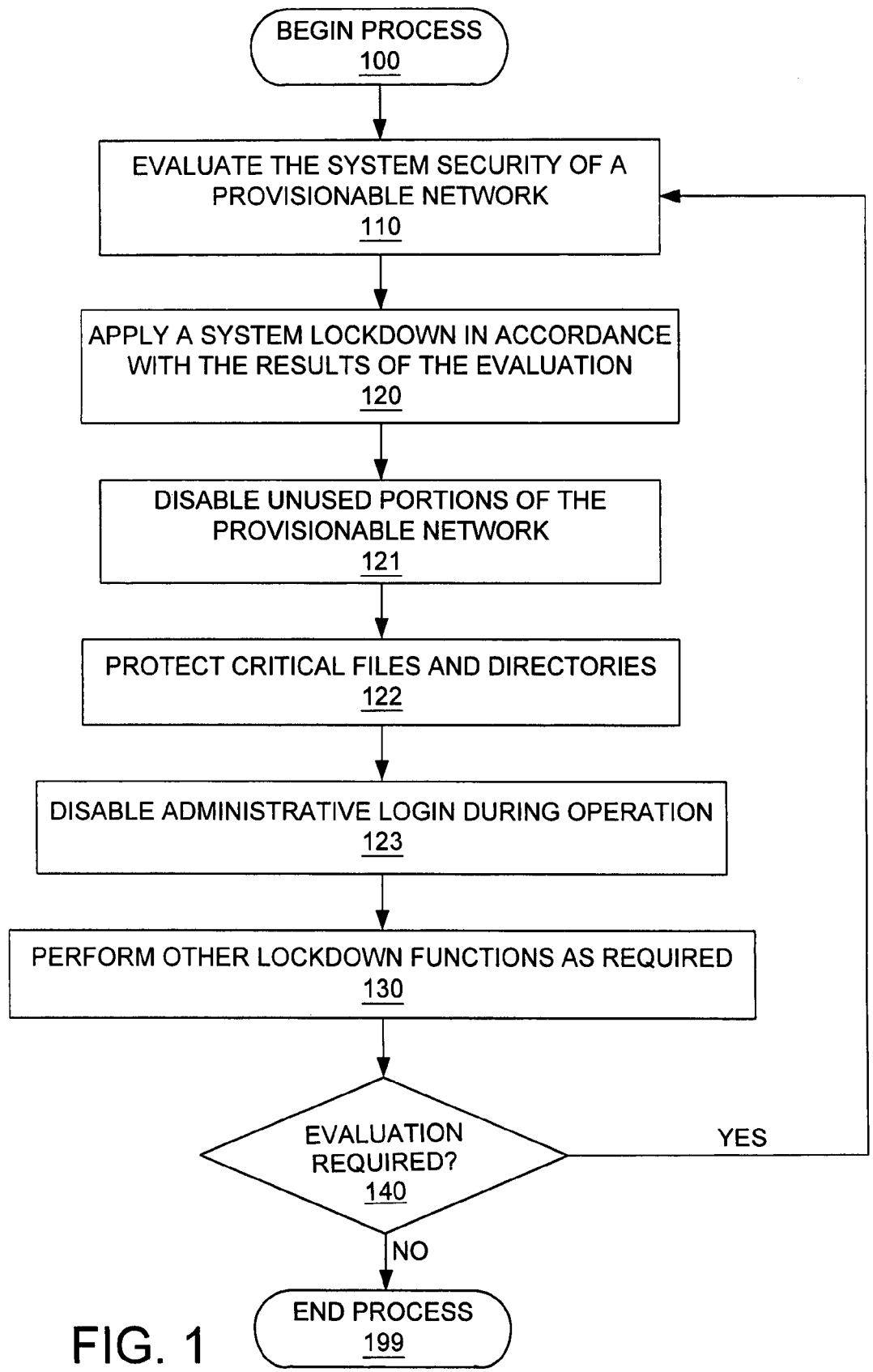
FIG. 1 illustrates a block flow diagram in accordance with embodiments of the present invention.

The operation of an embodiment of the present invention is illustrated in FIG. 1, in block flow form. It is noted here that embodiments of the present invention operate in the flexible and dynamically changing environment of the provisionable network or utility data center (UDC), which is illustrated subsequently in FIG. 2. Process 100 commences with evaluating the system security of a provisionable network, such as a UDC, 110. In response to the results of the evaluation, a system lockdown is applied to the provisionable network at 120. The lockdown applied can comprise a variety of functions which deprive an intruder of access to the IDS components, such as sensors and management functions. For example, the lockdown can involve items like requiring strong passwords, securing system directories and file permissions, closing data communication ports, and hiding the administrator account.

It is noted here that steps 121 through 130, in this embodiment, comprise the steps undertaken to lock down an IDS. At step 121, the unused portions of the IDS in the UDC, that is any resources not specifically and purposefully allotted to the use of the IDS, are disabled. The actual means of disablement depends on the specific resource being disabled and can include disabling the communications links to the specific resource or shutting down application processes running on the IDS.

At step 122, critical files and directories are protected. Because of the dynamic nature of files and directories in the management of a large and complex network such as a UDC, they must remain in operation for legitimate access. This step can include changing instant ownership of specific files or altering avenues of communication to and from the critical files and directories.

At step 123, the appropriate administrative login is disabled while the system is in operation. Because a common hacker entry to a system is the emulation of the legitimate system administrator, the administrator's normal entry is particularly susceptible to attack. This step in a lockdown application can prevent that avenue from being exploited by preventing all entries to the administrator's login at certain times or during certain parts of the operation of the UDC. It is noted here that the administrative user login is known as "administrator" or "root" on two common computer operating systems.

Other functions of the application of a system lockdown, dependent on the specific operations and on the construct of the specific UDC, are implemented at step 130. These can include, but are not limited to: disabling changes to system registry entries that are critical to the operating system and IDS software in an operating system that uses a system registry, disabling communications on selected TCP and UDP ports in the IDS management system that controls the IDS sensors, changing the "community string" to a non-public value if simple network management protocol (SNMP) services are required, requiring all users to have a valid password that is changed regularly and often, and other functions that are driven by the operational specifics of the UDC, its resources and its clients.

Embodiments of the present invention operate differently, depending on whether the IDS to which an embodiment is applied is a host intrusion detection system (HIDS) or a network intrusion detection system (NIDS). For HIDS protection, the application of a partial system lockdown focuses on non-network functions such as file and directory security, usernames and passwords for the HIDS users, and lockdown for the system directory entries in the applicable operating system.

When further evaluations, or reevaluations are required, 140, the process begins anew at 110. When evaluations are no longer required, this embodiment of the present invention is halted at 199.

Figure 2:
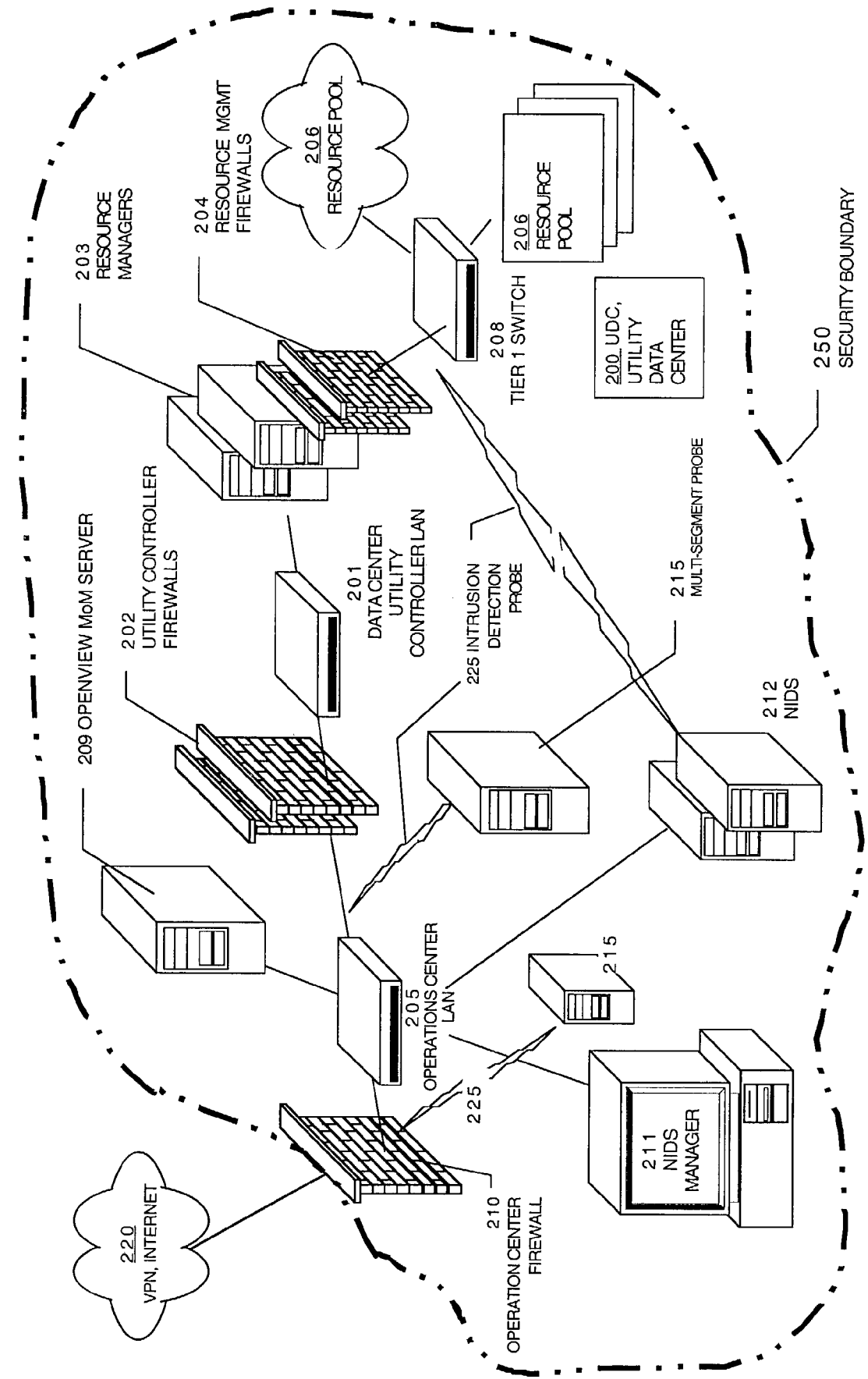
FIG. 2 illustrates a utility data center in accordance with embodiments of the present invention.

Embodiments of the present invention operate in the flexible and dynamically changing environment of the provisionable network or utility data center, (UDC). FIG. 2 illustrates a deployable network intrusion detection system 212 with probes in a typical provisionable utility data center. Provisionable network or utility data center (UDC) 200 is shown bounded by a virtual security boundary 250. Boundary 250 is shown here only to help illuminate the concepts presented herein. In implementations of embodiments of the present invention, virtual boundary 250 can extend logically to encompass elements of the UDC physically located on a different continent from other elements.

Typical UDC 200 comprises an operations center local area network (LAN) 205, a data center utility controller LAN 201 and resource pools 206. It is noted here that, by their very nature, UDCs are flexible in their composition, comprising any number and type of devices and systems. It is the flexibility from which they derive their usefulness.

Typical UDC 200, in this illustration, communicates with the outside world via the Internet and virtual private network (VPN) 220. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that, in typical UDC 200, there are three "trust domains;" LANs or subsystems that are accessible to and operated by differing levels of system management, each of which is protected by embodiments of the present invention. The significance of the distinction in trust level attached to each trust domain will become clearer in subsequent discussion. The level of trust, in the operating environment of embodiments of the present invention, can be established in a trust hierarchy.

Firewall 210 divides an overall trust domain, the UDC, from the outside world indicated by internet and virtual private network (VPN) network 220. Operations center (OC) LAN 205 comprises an internal trust domain. Included in OC LAN 205 are manager-of-managers (MoM) server 209, network intrusion detection system (NIDS) 212, NIDS manager 211 and multi-segment probe 215. It is noted that, though NIDS 212, NIDS manager 211 and multi-segment probe 215 are illustrated as computer-like devices, their physical existence is not limited to a particular device. Each may exist as a standalone device or may be implemented as software resident in a physical device or server. Intrusion detection probes 225 are illustrated as actions, rather than any form of device.

The heart of a UDC is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UDC concept can result in many combinations of resources and resource managers. Resource managers 203 are the typical interface with the various pools of resources 206, communicating with them through some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

It is noted again that virtual security boundary 250 does not exist in a physical sense. Resources included in resource pools 206 may include devices and servers located at distance from the other elements of the UDC 200.

NIDS 212 communicates directly with the OC LAN 205. Intrusion detection probes 225 are deployed in the UDC 200 such that the management components of the UDC 200 are protected from intrusions that originate from either an external source, such as the public facing Internet/VPN 220, the managed resources, 206, that are provisioned by the UDC 200, or the systems within the less trusted part of the UDC management infrastructure. It is noted here that the term "infrastructure", as used in this discussion of embodiments of the present invention, includes computers, routers, hubs, switches, cables, wireless connections, I/O devices, software, operating systems and any other hardware or software implemented device or function involved in the makeup of a physical or virtual network, whether it be a LAN, WAN, VPN, or any other function implemented in or on networks.

This embodiment of the present invention operates in an environment which distinguishes between three trust domains established in a trust hierarchy:

1. The Operations Center (OC) LAN 205 where non-critical UDC and other Operations related functions reside. The level of trust is less than the Data Center Control LAN 201.

2. The Data Center Control LAN 201 where tasks relating to the automated provisioning of managed resources 206 reside. Access to the Data Center LAN 201 is severely restricted.

3. The Managed Resources LANs where the managed resources 206 reside. These LANs are typically not trusted.

It is noted here that clients of the UDC originate outside the trust structure and access elements of the UDC via the Internet or a virtual private network (VPN) resident in the Internet infrastructure.

As shown in FIG. 2, NIDS probes 225 are deployed around the firewalls 202 and 204 that provide ingress/egress to the Data Center Control LAN 201. Probes 225 are also deployed around the Resource Managers 203 that act as a gateway between the Managed Resources and the Data Center Control LAN 201.

The probes 225 send alert messages to the NIDS Manager 211. As part of the initiated response to an alert message, the NIDS Manager 211 is configured to raise or lower the priority of each alert depending upon the both the probe that detected the alert and, the type of alert that was detected.

The NIDS Manager 211 in turn sends its highest priority alerts to an alert monitor located in the Operations Center LAN 205. Not shown in FIG. 2, but present on each computer system in the Operations Center 205 and Data Center Controller LANs 201, is host intrusion detection system (HIDS) software.

The HIDS is tuned, or configured, to the functions provided by each system to minimize the number of false intrusion alerts. Alerts are sent to the event monitor residing in the Operations Center 205. Alerts are also sent to a HIDS manager that resides on the same system as the event monitor.

The event monitor, resident in OC 205, captures events from both the HIDS and NIDS and from the firewall 210 deployed between the Operations Center and the External VPN or Internet. An optional NIDS probe or set of probes can be deployed between this firewall 210 and the Operations Center LAN 205. The event monitor may reduce and correlate events from both the HIDS and NIDS.

Each of the systems in this embodiment of the present invention, and the NIDS probes, have their software operating system protected by the "lock-down" software presented in this discussion of embodiments of the present invention such that they are rendered more difficult to gain unauthorized access to. As was discussed above, the lock-down software configuration is tailored to the individual systems.

Embodiments of the present invention allow a convenient management device in that HIDS and NIDS events and alerts for UDC 200 are displayed in a single browser available to UDC management.

HIDS and NIDS configurations are customizable for a UDC. The embodiment of the present invention discussed here integrates technology provided from data communications switch vendors, data communications firewall vendors, network intrusion detection software vendors, host intrusion detection software vendors, and operating system lockdown software. Both HIDS and NIDS are provided for a UDC.

Figure 3:
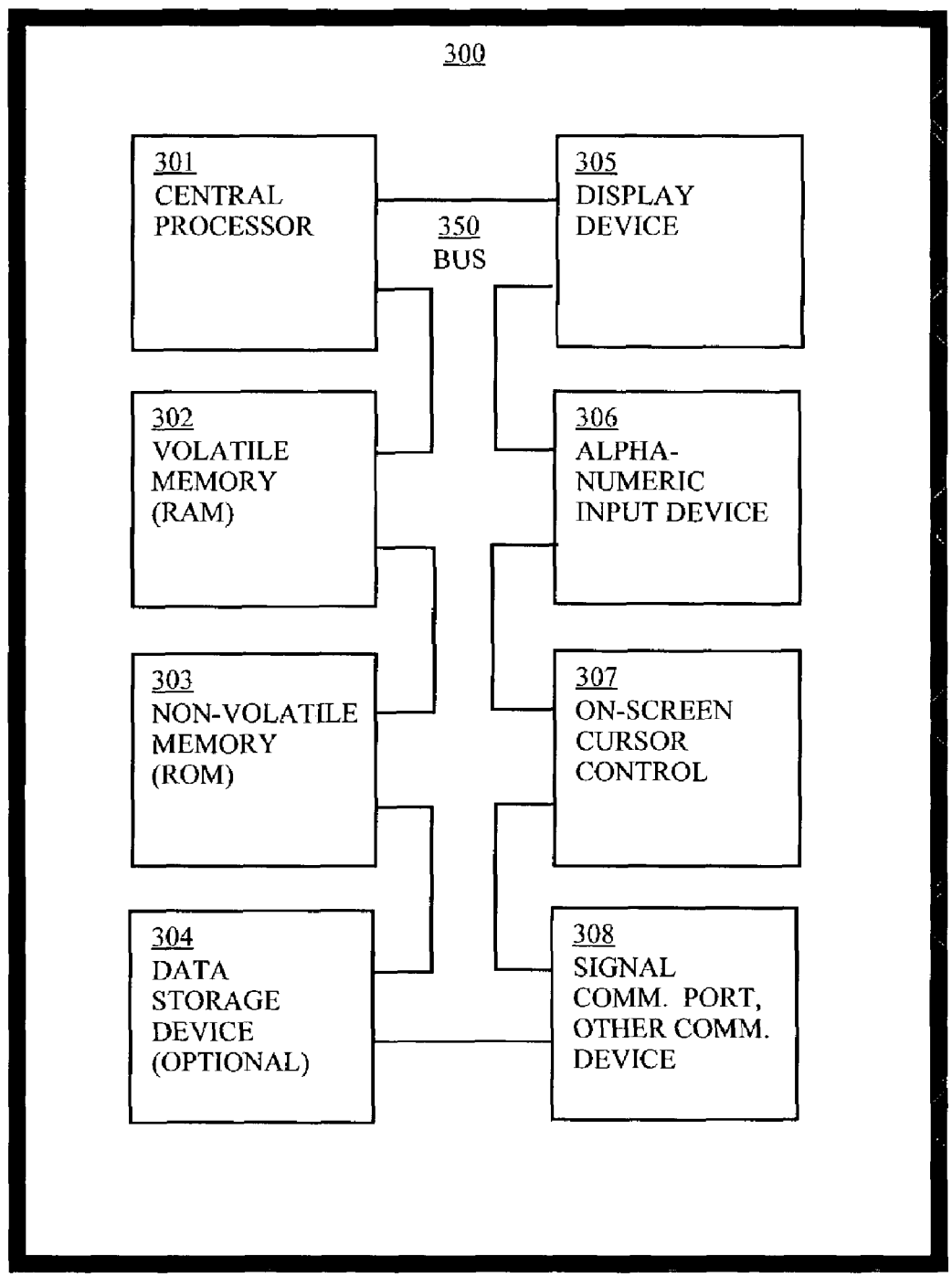
FIG. 3 illustrates a block diagram overview of generic computer system in accordance with embodiments of the present invention.

The software components of embodiments of the present invention run on computers. A configuration typical to a generic computer system is illustrated, in block diagram form, in FIG. 3. Generic computer 300 is characterized by a processor 301, connected electronically by a bus 350 to a volatile memory 302, a non-volatile memory 303, possibly some form of data storage device 304 and a display device 305. It is noted that display device 305 can be implemented in different forms. While a video CRT or LCD screen is common, this embodiment can be implemented with other devices or possibly none. System management is able, with this embodiment of the present invention, to determine the actual location of the means of output of alert flags and the location is not limited to the physical device in which this embodiment of the present invention is resident.

Similarly connected via bus 350 are a possible alpha-numeric input device 306, cursor control 307, and communication I/O device 308. An alpha-numeric input device 306 may be implemented as any number of possible devices, but is commonly implemented as a keyboard. However, embodiments of the present invention can operate in systems wherein intrusion detection is located remotely from a system management device, obviating the need for a directly connected display device and for an alpha-numeric input device. Similarly, the employment of cursor control 307 is predicated on the use of a graphic display device, 305. Communication I/O device 308 can be implemented as a wide range of possible devices, including a serial connection, USB (Universal Serial Bus), an infrared transceiver, a network adapter or an RF (Radio Frequency) transceiver.

The configuration of the devices in which this embodiment of the present invention is resident can vary without effect on the concepts presented here. The flexibility of the UDC concept provides a limitless variety of possible hardware device and inter-linking combinations in which embodiments of the present invention are able to be provided.

This description of embodiments of the present invention provides a methodology to provide security to the intrusion detection system sensors in a provisionable data center such that the management components of the data center are protected from intrusions that originate from either an external source, such as the public facing internet/VPN, the managed resources that are provisioned by the UDC, or the systems within a less trusted part of the UDC management infrastructure. While the host and network IDS sensors protect the data center, embodiments of the present invention protect the sensors themselves from attackers that do not wish their suspicious network activity to be detected; activity that could lead to a compromise of system or network confidentiality, integrity, or availability.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for providing security for an intrusion detection system in a provisionable data center, said method comprising:
    evaluating system security of a provisionable data center, wherein said evaluating system security includes determining portions of said provisionable data center specifically and purposefully allotted for use by said intrusion detection system; and
    applying a system lockdown in said provisionable data center in accordance with results of said evaluating indicating a presence of an intruder in said provisionable data center, said system lockdown to deprive said intruder of access to said portions including depriving said intruder of access to sensors, management functions, files, and directories of said intrusion detection system, and wherein said applying said system lockdown further comprises disabling unused provisionable services of said provisionable data center and disabling any portions of said provisionable data center not specifically and purposefully allotted for use by said intrusion detection system.

2. The method for providing security described in claim 1 wherein said intrusion detection system is implemented as a host intrusion detection system.

3. The method for providing security described in claim 2 wherein said host intrusion detection system is implemented as software resident in said provisionable data center.

4. The method for providing security described in claim 1 wherein said intrusion detection system is implemented as a network intrusion detection system.

5. The method for providing security described in claim 1 wherein said provisionable data center comprises a resource pool.

6. The method for providing security described in claim 1 wherein said provisionable data center comprises a resource manager.

7. The method for providing security described in claim 1 wherein said provisionable data center comprises a network intrusion detection system.

8. The method for providing security described in claim 1 wherein said intrusion detection system comprises a dedicated hardware device.

9. The method for providing security described in claim 1 wherein said intrusion detection system comprises software resident in said provisionable data center.

10. The method for providing security described in claim 1 wherein said applying said system lockdown comprises protecting files and directories of an operating system within said provisionable data center.

11. The method for providing security described in claim 1 wherein said applying said system lockdown comprises disabling an administrative user login.

12. The method for providing security described in claim 11 wherein said disabling an administrative user login comprises disabling a root directory.

13. The method for providing security described in claim 1 wherein said applying said system lockdown comprises disabling a change to a system registry entry.

14. The method for providing security described in claim 1 wherein said applying said system lockdown comprises performing a change to a system registry entry.

15. The method for providing security described in claim 1 wherein said applying said system lockdown comprises disabling communication on a selected communication port.

16. A system for providing security for an intrusion detection system in a provisionable data center, comprising:
    a local area network of a provisionable data center, said local area network comprising an intrusion detection system and an operations center with a server;
    an intrusion detection system manager communicatively coupled to components within said local area network; and
    an intrusion detection system sensor enabled to detect and respond to an intrusion in said local area network, wherein said intrusion detection system sensor is enabled to detect an intrusion directed to said intrusion detection system and, in response to detection of said intrusion directed to said intrusion detection system, and wherein said intrusion detection sensor is further enabled to trigger applying of a system lockdown to deny an intruder access to portions of said provisionable data center which are specifically and purposefully allotted for use by said intrusion detection system, said system lockdown additionally including depriving said intruder of access to sensors, management functions, files, and directories of said intrusion detection system, and wherein said applying said system lockdown further comprises disabling unused provisionable services of said provisionable data center and disabling any portions of said provisionable data center not specifically and purposefully allotted for use by said intrusion detection system.

17. The system described in claim 16 wherein said intrusion detection system comprises a host intrusion detection system.

18. The system described in claim 17 wherein said host intrusion detection system comprises software resident in a hardware device.

19. The system described in claim 16 wherein said intrusion detection system comprises a network intrusion detection system.

20. The system described in claim 19 wherein said network intrusion detection system comprises a dedicated hardware device.

21. The system described in claim 16 wherein said provisionable data center comprises a resource pool.

22. The system described in claim 16 wherein said provisionable data center comprises a resource manager.

23. The system described in claim 16 wherein said applying said system lockdown comprises protecting files and directories of an operating system within said provisionable data center.

24. The system described in claim 16 wherein said applying said system lockdown comprises disabling a change to a system registry entry.

25. The system described in claim 16 wherein said applying said system lockdown comprises performing a change to a system registry entry.

26. The system described in claim 16 wherein said applying said system lockdown comprises disabling communication on a selected communication port.

27. The system described in claim 16 wherein said applying said system lockdown comprises disabling an administrative user login.

28. The system described in claim 27 wherein said disabling an administrative user login comprises disabling a root directory.

* * * * *